United States Patent
Yokota et al.

(10) Patent No.: US 9,129,160 B2
(45) Date of Patent: Sep. 8, 2015

(54) VEHICLE PERIPHERY MONITORING APPARATUS

(71) Applicant: DENSO CORPORATION, Aichi-Pref. (JP)

(72) Inventors: Nobuyuki Yokota, Kariya (JP); Junshi Utsu, Nagoya (JP); Muneaki Matsumoto, Okazaki (JP)

(73) Assignee: DENSO CORPORATION, Kariya (JP)

( * ) Notice: Subject to any disclaimer, the term of this patent is extended or adjusted under 35 U.S.C. 154(b) by 223 days.

(21) Appl. No.: 13/739,101

(22) Filed: Jan. 11, 2013

(65) Prior Publication Data

US 2013/0182109 A1     Jul. 18, 2013

(30) Foreign Application Priority Data

Jan. 17, 2012    (JP) ................. 2012-007345

(51) Int. Cl.
    *G06K 9/00*       (2006.01)

(52) U.S. Cl.
    CPC ........ *G06K 9/00791* (2013.01); *G06K 9/00805* (2013.01); *B60R 2300/802* (2013.01)

(58) Field of Classification Search
    CPC ................................................. G06K 9/00805
    See application file for complete search history.

(56) References Cited

U.S. PATENT DOCUMENTS

| | | | | |
|---|---|---|---|---|
| 4,718,090 A | * | 1/1988 | Cooper, Jr. ................... | 382/204 |
| 5,410,346 A | * | 4/1995 | Saneyoshi et al. ........... | 348/116 |
| 5,574,762 A | * | 11/1996 | Sato et al. ................... | 377/6 |
| 6,445,809 B1 | | 9/2002 | Sasaki et al. | |
| 7,671,725 B2 | * | 3/2010 | Tsuji et al. ................... | 340/435 |
| 8,958,977 B2 | * | 2/2015 | Yanagawa et al. ........... | 701/301 |
| 2002/0095246 A1 | | 7/2002 | Kawazoe | |
| 2004/0057599 A1 | * | 3/2004 | Okada et al. ................. | 382/103 |
| 2004/0246123 A1 | | 12/2004 | Kawabe et al. | |
| 2005/0083427 A1 | | 4/2005 | Imoto | |
| 2008/0055407 A1 | * | 3/2008 | Abe .............................. | 348/118 |
| 2008/0056534 A1 | * | 3/2008 | Kigasawa .................... | 382/103 |

(Continued)

FOREIGN PATENT DOCUMENTS

| | | |
|---|---|---|
| JP | 09-044761 A | 2/1997 |
| JP | 2000-074645 A | 3/2000 |

(Continued)

OTHER PUBLICATIONS

Machine English Translation of JP2006040092.*

(Continued)

*Primary Examiner* — Behrooz Senfi
*Assistant Examiner* — Mohammed Jebari
(74) *Attorney, Agent, or Firm* — Posz Law Group, PLC

(57) ABSTRACT

A vehicle periphery monitoring apparatus detects the presence of a moving object along a vehicle periphery. The apparatus sets multiple detection lines along a horizontal axis of an image captured by a camera, and detects a brightness change of a pixel along the detection lines. With reference to the brightness change detected along the detection line and a parameter for determining whether such brightness change is caused by the moving object, the apparatus determines the presence of the moving object. In addition, the apparatus changes a determination condition for determining the moving object such that as the number of detection lines along which the brightness change is detected decreases, the harder it is to satisfy the determination condition for determining that the moving object is present.

12 Claims, 7 Drawing Sheets

(56) References Cited

U.S. PATENT DOCUMENTS

| | | | |
|---|---|---|---|
| 2009/0296987 A1* | 12/2009 | Kageyama et al. | 382/103 |
| 2011/0205363 A1 | 8/2011 | Suzuki | |
| 2011/0301846 A1 | 12/2011 | Yanagawa et al. | |
| 2013/0141542 A1* | 6/2013 | Tsuchiya et al. | 348/46 |

FOREIGN PATENT DOCUMENTS

| | | |
|---|---|---|
| JP | A-2001-189925 | 7/2001 |
| JP | A-2002-230531 | 8/2002 |
| JP | A-2003-331397 | 11/2003 |
| JP | 2004-185537 A | 7/2004 |
| JP | 2005-088890 A | 4/2005 |
| JP | A-2005-123968 | 5/2005 |
| JP | 2005-148863 A | 6/2005 |
| JP | 2005-217482 A | 8/2005 |
| JP | 2005-335437 A | 12/2005 |
| JP | 2006-040092 A | 2/2006 |
| JP | 2006-040165 A | 2/2006 |
| JP | A-2011-154580 | 8/2011 |
| JP | 2011-175468 A | 9/2011 |

OTHER PUBLICATIONS

Machine English Translation of WO2012023412A1.*
U.S. Appl. No. 13/727,051, filed Dec. 26, 2012, Yokota et al.

* cited by examiner

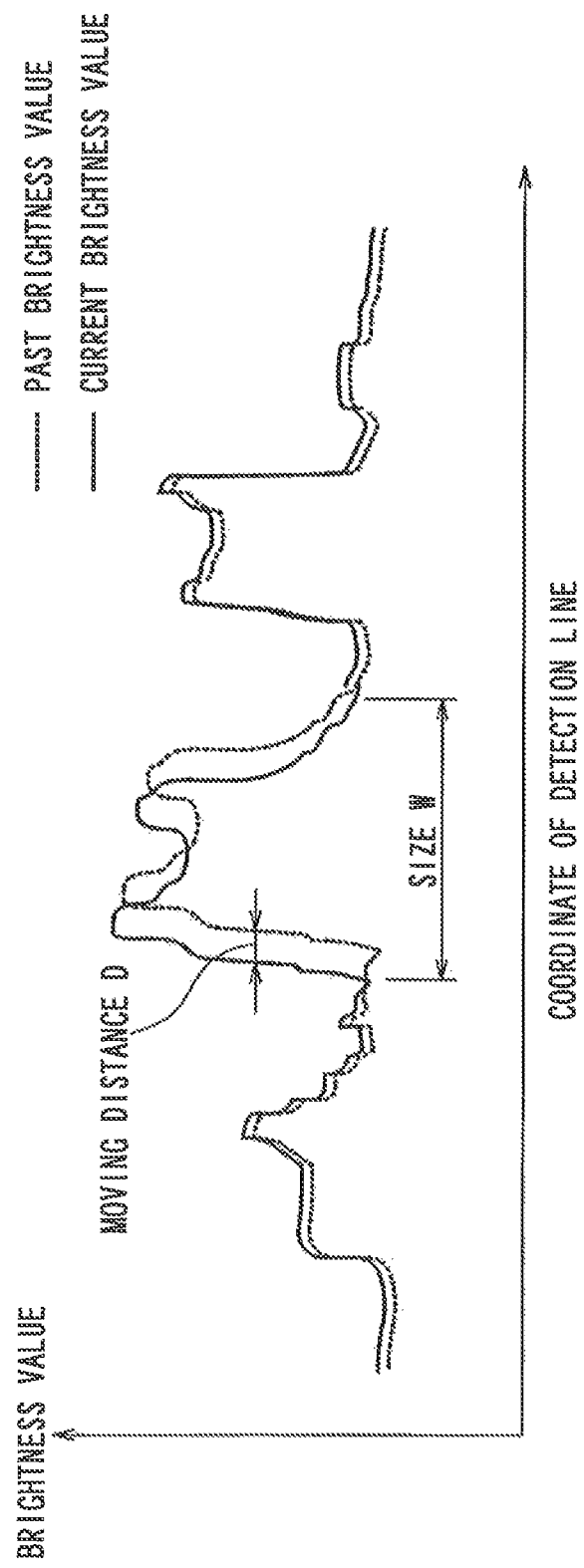

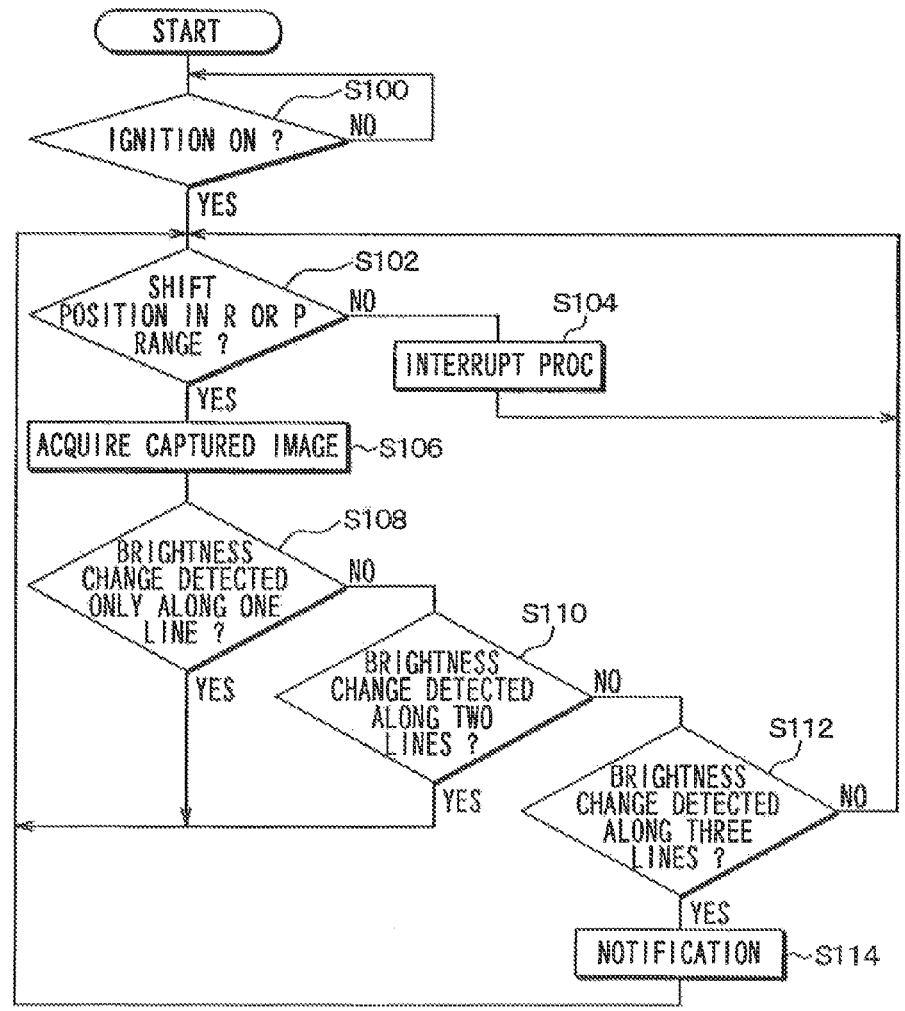

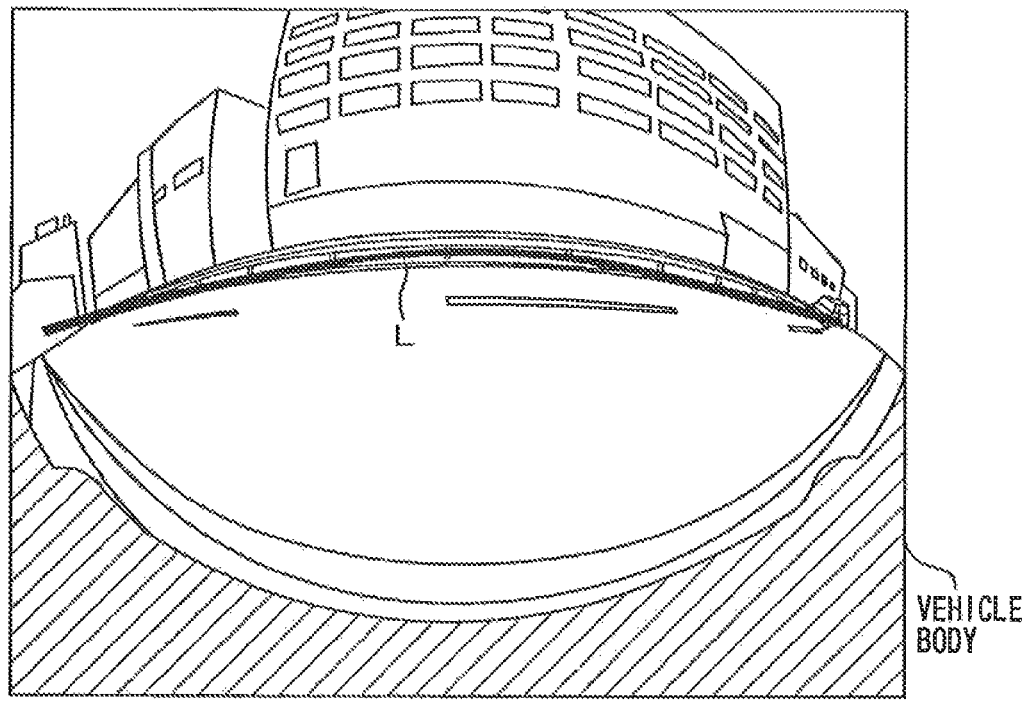

VEHICLE PERIPHERY MONITORING APPARATUS

CROSS REFERENCE TO RELATED APPLICATION

The present application is based on and claims the benefit of priority of Japanese Patent Application No. 2012-7345, filed on Jan. 17, 2012, the disclosure of which is incorporated herein by reference.

TECHNICAL FIELD

The present disclosure generally relates to a vehicle periphery monitoring apparatus for monitoring a moving object around a vehicle.

BACKGROUND

Conventionally, as disclosed in Japanese Patent Laid-Open No. 2005-110202 (JP '202), a vehicle periphery monitoring apparatus having a wide-angle lens camera is proposed for providing a driver of a subject vehicle with a wider field of view, which has a view angle of at least 180 degrees. Though such an apparatus has a very wide view angle, a trade-off of having a smaller image size for an object captured in a corner/periphery of a captured image cannot be avoided. More practically, when a vehicle backs up, the driver of the subject vehicle, even though staring at the captured image of a rear view of the vehicle, cannot notice/recognize an object captured in the corner of the captured image that is very small, since the driver's attention is naturally drawn to a nearby vehicle parking on the left/right of the subject vehicle with minimum clearance.

Therefore, for example, a monitoring apparatus that emphasizes a moving object on a display unit is proposed in Japanese Patent Laid-Open No. 2005-123968 (JP '968), which emphasizes the moving object after cropping such object from the captured image. In JP '968, the emphasizing scheme of the moving object is disclosed as a calculation of an optical flow of feature points in the captured image and a formation of a motion vector for each of the feature points, enabling a cropping of the moving object from the captured image. The cropped moving object in a dead angle of the subject vehicle Is then displayed in an emphasized manner on the display unit, thereby allowing the driver of the subject vehicle to easily notice/recognize such a dangerous object in the dead angle.

However, extraction of the motion vectors from the captured Image by processing an image based on a calculation of the optical flow, as provided in JP '968, requires a huge processing load. Thus, an accurate cropping in response to the motion of the moving object may only be enabled by a separate/dedicated processor for having processing results in a timely manner.

Therefore, as shown in FIG. 9, in some recently-developed image capturing apparatus, a detection line L extending horizontally in a left-to-right axis is set in the captured image for capturing an outside periphery of the subject vehicle for the detection of the moving object. A detection area for detecting the moving object is narrowed to such detection line L.

Specifically, by setting the detection line horizontally along the left-to-right axis of the captured image, the moving object may be detected based upon a brightness change of the pixels along the detection line and a determination threshold (i.e., a parameter) for determining whether the brightness change of the pixels is caused by the moving object.

However, when the moving object is detected based on a configuration that detects the moving object according to the brightness change of the pixels along one detection line, a vertical size of the moving object is not considered in the captured image. In particular, a false detection of a moving object may be possible. For instance, fallen leaves or a noise in the image may be detected as the moving object, which should not be detected. Such false detection leads to an inaccurate device.

SUMMARY

In an aspect of the present disclosure, a vehicle periphery monitoring apparatus includes: a detection unit and a moving object determination unit.

The detection unit detects a brightness change of a pixel along a plurality of detection lines. Specifically, using an image captured by an in-vehicle camera, the plurality of detection lines extend along a right-left axis of the image, and the brightness change of the pixel is detected along such detection lines.

The moving object determination unit determines whether the moving object is present based on the brightness change of the pixel detected by the detection unit and a parameter for evaluating the brightness change to determine whether the brightness change of the pixel along the detection lines is caused by the moving object. The moving object determination unit further changes a determination condition for determining whether the moving object is present based upon a number of the detection lines along which the brightness change is detected by the detection unit. In particular, as the number of detection lines that have the brightness change decreases, the harder it is to satisfy the determination condition for determining that the moving object is present.

Based on the moving object determination scheme, the change of the detection condition makes it harder for the apparatus to determine that the moving object is present when the brightness change of the pixel is detected along fewer detection lines. Therefore, the detection accuracy for detecting the moving object is improved and the processing load for performing the moving object determination process is reduced.

BRIEF DESCRIPTION OF THE DRAWINGS

Other objects, features and advantages of the present disclosure will become more apparent from the following detailed description disposed with reference to the accompanying drawings, in which:

FIG. 4 is a graph of a past and current brightness value of the detection line for detecting a moving object;

FIG. 5 is a table defining parameters;

FIG. 6 is a flowchart of a process performed by a CPU of the vehicle periphery monitoring apparatus in a first embodiment of the present disclosure;

FIG. 9 is an illustration a detection line of prior art reference.

DETAILED DESCRIPTION (First Embodiment)

Figure 1:
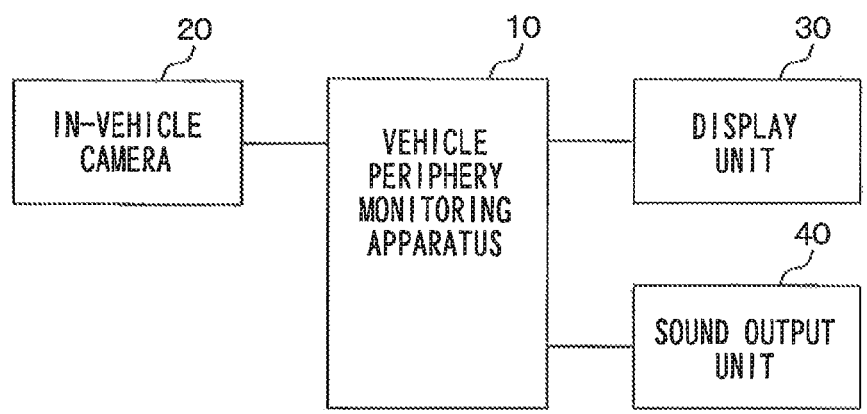
FIG. 1 is a block diagram of a vehicle periphery monitoring apparatus of the present disclosure.

FIG. 1 shows a configuration block diagram of a vehicle periphery monitoring apparatus 10 in a first embodiment of the present disclosure. The vehicle periphery monitoring apparatus 10 is coupled to an in-vehicle camera 20 for capturing a periphery of a subject vehicle, a display unit 30 and a sound output unit 40 respectively connected thereto.

The vehicle periphery monitoring apparatus 10 is devised as a vehicle periphery image display apparatus coupled to the existing components, i.e., the in-vehicle camera 20, the display unit 30 and the sound output unit 40, with a detection function of detecting a moving object around the subject vehicle and notifying the vehicle occupant of the detected moving object.

The vehicle periphery monitoring apparatus 10 is implemented as a computer, including CPU, ROM, RAM, EEPROM, I/O and the like. The CPU of the vehicle periphery monitoring apparatus 10 performs various processes according to a program stored by the ROM.

The in-vehicle camera 20 is installed in the vehicle as a rear-view camera capturing an image of a rear view of the subject vehicle. The in-vehicle camera 20 has a wide-angle lens with, for example, an angle range of 185 degrees, 300,000 pixels in one frame of the captured image, and a frame rate of 30 frames per second (fps).

The display unit 30 has a display unit of, for example, a liquid crystal device, and displays an image on such display unit according to a video signal from the vehicle periphery monitoring apparatus 10.

The sound output unit 40 outputs a sound/voice according to a voice signal from the vehicle periphery monitoring apparatus 10.

The vehicle periphery monitoring apparatus 10 outputs from the in-vehicle camera 20 to the display unit 30 an image signal to display a captured image. When the vehicle periphery monitoring apparatus 10 detects a moving object included in the captured image from the in-vehicle camera 20, it outputs an image signal to the display unit 30 to display an image that emphasizes the detected moving object in a preset color, and outputs a voice signal to the sound output unit 40 for notifying the detection of the moving object.

The EEPROM of the vehicle periphery monitoring apparatus 10 stores a parameter table that is used to determine whether the brightness change is caused by the moving object.

Figure 2:
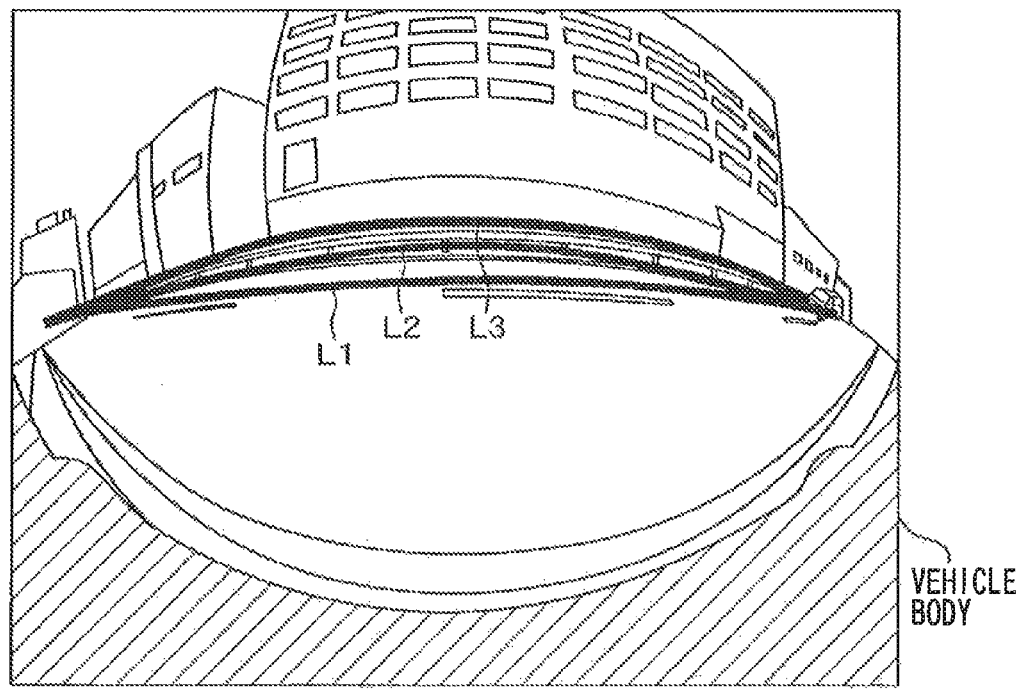
FIG. 2 is an illustration of three detection lines set in a captured image by the vehicle periphery monitoring apparatus.

With reference to FIG. 2, the vehicle periphery monitoring apparatus 10 sets three detection lines L1, L2, and L3 extending along a right-to-left axis of the captured image, and detects the brightness change of the pixel along the detection lines L1 to L3. Further, the apparatus 10 performs a process for determining a moving object based on (i) the brightness change of the pixel along the detection lines L1 to L3 and (ii) a parameter for determining whether the brightness change of the pixel along the detection lines L1 to L3 is caused by the moving object.

Figure 3:
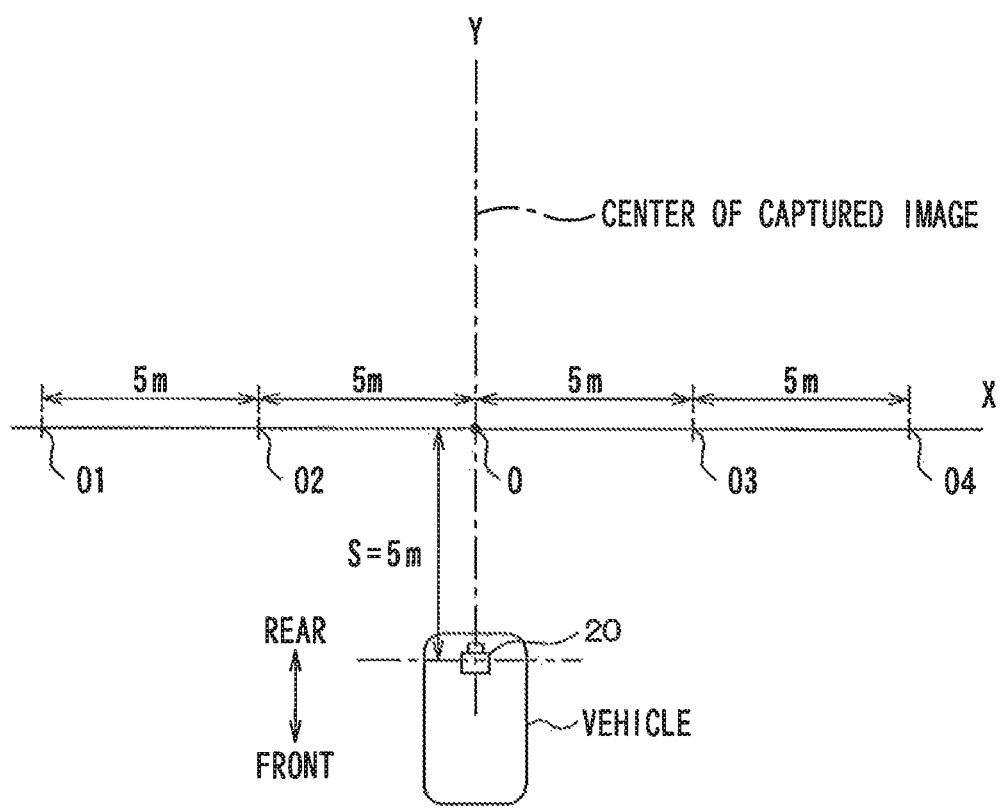
FIG. 3 is an illustration of a vehicle with an in-vehicle camera in a downward view.

FIG. 3 shows an illustration of the vehicle having the in-vehicle camera 20 from a top view looking down. A reference position O is located at a distance (S) of 5 meters from the in-vehicle camera 20 behind the subject vehicle ("S=5").

Four spots O1 to O4 are positioned along a line (i.e., X-axis) that is perpendicular to a vehicle's longitudinal axis (i.e., Y-axis) (i.e., a vehicle's rear view direction toward the position O, in which direction the in-vehicle camera 20 is aligned).

The detection line L1 in the present embodiment is set to be displayed on top of the reference position O at the center of the captured image, with the distance to the position O set to be 5 meters, as described above. Further, the detection line L1 is set to be positioned on top of the four spots O1 to O4 located in a direction that is perpendicular to the vehicle's rear view direction (Y-axis), which is in line with the camera view direction of the in-vehicle camera 20, pointing to the reference position O.

In other words, the detection line L1 is positioned on top of a certain point having a preset distance from the in-vehicle camera 20 at the center of the captured image to define a virtual line that falls on top of other spots. The other spots toward the left and the right in the captured image respectively have gradually longer distances from the in-vehicle camera 20, as the positions of the other spots shift away from the center of the captured image.

The detection line L2 is positioned, such that it would be at a mid-level position (e.g., about 1.5 meter height of) a moving object (e.g., a pedestrian, a two-wheel vehicle, an automobile) when such moving object is located along the line created by the reference position O and the four spots O1-O4, In other words, the detection line L2 is positioned at a "waist position" of such moving object or around one-half of the height of the moving object. The detection line L3 is positioned, such that it would be at a "head position" or around a top of the moving object when such moving object is located along the line created by the reference position O and the four spots O1-O4.

Further, a gap between the three detection lines L1 to L3 is widest at the center of the captured image, and the gap between the detection lines L1 to L3 gradually becomes smaller toward the right and left of the captured image. In other words, the detection lines L1 to L3 are set in consideration of the size (i.e., height) of the moving object in the captured image.

With reference to FIG. 4, a detection method for detecting the moving object based on the past brightness value and the current brightness value is described. Such detection method is performed for each of the detection lines L1, L2, and L3.

FIG. 4 illustrates an example of the past brightness value of the pixel and the current brightness value of the pixel respectively detected along the detection line. The horizontal axis of the graph in FIG. 4 represents a coordinate on the detection line, and the vertical axis of the graph in FIG. 4 represents a brightness value.

When a shift is observed between the past brightness value and the current brightness value, the coordinate of such shift is considered as the position of the moving object. More practically, the horizontal size of the moving object corresponds to a width W (i.e., size W) of the coordinate of a shift portion between a rise and a fall of the brightness value where the shift is observed. Also, a moving speed of the moving object per unit time corresponds to a moving distance D of the brightness change in the horizontal direction. Based on the past and current brightness values, the horizontal size and the moving distance of the moving object are identified.

With reference to FIG. 5, the parameter defines the size W and the moving distance D (i.e., speed) of the brightness change along the detection line. The size W is defined as the number of pixels that have changed brightness along the detection line in the horizontal direction. The moving distance D is defined as the number of pixels corresponding to the amount of per-unit-time movement of the pixels that have changed brightness change along the detection line. The size W and the moving distance D are defined respectively for an automobile, a two-wheel vehicle, and a pedestrian.

The parameter for the moving distance D is set as a moving speed at 30 km/h for the automobile, at 15 km/h for the two-wheel vehicle, and at 8 km/h for the pedestrian. These values may be determined based on an experiment.

The vehicle periphery monitoring apparatus 10 determines the moving object based on actual detected size W and moving distance D of pixels that have changed brightness along the detection lines L1 to L3 and based on the parameter defining the size W and the moving distance D of various moving objects.

Though not shown in FIG. 5, the parameter also defines a rise threshold and a fall threshold for each of the various moving objects. The rise threshold and the fall threshold determine whether a rise and a fall of the brightness change along the detection line is caused by a moving object. In particular, it is assumed that the rise and fall of the brightness change detected along the detection line is caused by the same moving object. Accordingly, the rise threshold and fall threshold used for determining the presence of a moving object are associated with the same parameter for the same moving object. For instance, the rise threshold and the fall threshold of the automobile would be used for determining whether the brightness change detected is caused by an automobile.

The vehicle periphery monitoring apparatus 10 determines that the brightness change of the pixel along the detection line is caused by a moving object when (i) the rise of the brightness change of a shifting portion along the detection line is equal to or greater than the rise threshold and (ii) the fall of the brightness change of the shifting portion along the detection line is equal to or greater than the fall threshold.

Further, the vehicle periphery monitoring apparatus 10 determines that the brightness change of the pixel along the detection line is not being caused by a moving object when (i) the rise of the brightness change of a shifting portion along the detection line is smaller than the rise threshold or (ii) the fall of the brightness change of the shifting portion along the detection lines L1 to L3 is smaller than the fall threshold.

The vehicle periphery monitoring apparatus 10 determines whether the amount of movement of the brightness change along the detection lines L1 to L3, which is assumed to be caused by the same moving object, is caused by a moving object. In particular, when the amount of movement of the brightness change detected along the detection lines L1 to L3 is equal to or greater than a movement threshold, a moving object is determined to be causing the brightness change of along the detection lines L1 to L3.

On the other hand, the vehicle periphery monitoring apparatus 10 determines that the amount of movement of the brightness change along the detection lines L1 to L3, which is assumed to be caused by the same moving object, is not being caused by a moving object when the amount of movement of the brightness change detected along the detection lines L1 to L3 is less than the movement threshold.

When the rise and fall thresholds for evaluating the rise and fall of the brightness change of the pixel along the detection line are increased, the determination of whether the brightness change detected is caused by a moving object is made harder (i.e., difficult to satisfy threshold). On the other hand, when the rise and fall thresholds for evaluating the rise and fall of the brightness change of the pixel align the detection lines L1 to L3 are decreased, the determination of whether the brightness change detected is caused by a moving object is made easier (i.e., easier to satisfy threshold).

Further, a simultaneous brightness change of the pixel for each of the detection lines L1, L2, and L3 are assumed to be made by the same moving object (i.e., a single moving object). In particular, the simultaneous brightness change is the rise and fall of the brightness value that substantially occurs at the same point in time, such as a GPS time for each the detection lines L1, L2, L3. Therefore, when the rise and fall thresholds for evaluating the rise and fall of the brightness change of the pixel along the detection lines L1 to L3 are increased, the determination of whether the brightness change detected is caused by a moving object (i.e., a single moving object) is made harder (i.e., difficult to satisfy threshold). On the other hand, when the rise and fall thresholds for evaluating the rise and fall of the brightness change of the pixel along the detection lines L1 to L3 are decreased, the determination of whether the brightness change detected is caused by a moving object (i.e., a single moving object) is made easier (i.e., easier to satisfy threshold).

Further, when the movement threshold for evaluating the amount of movement of the brightness change detected along the detection line L1 to L3, which is assumed to be caused by the same moving object, is increased, the determination of whether the amount movement of the brightness change detected is caused by a moving object (i.e., a single moving object) is made harder (Le., difficult to satisfy threshold). On the other hand, when the movement threshold for evaluating the amount of movement of the brightness change detected along the detection line L1 to L3 is decreased, the determination of whether the amount of movement of the brightness change detected is caused by a moving object (i.e., a single moving object) is made easier (i.e., easier to satisfy threshold).

To improve the detection accuracy for detecting a moving object, the vehicle periphery monitoring apparatus 10 changes a determination condition for determining the moving object in a manner that the fewer the number of detection lines on which the brightness change of the pixel is detected, the harder the determination that the moving object is present is made.

More practically, when the brightness change of the pixel, which is assumed to be caused by the same moving object, is detected on all of the three detection lines, it is determined that the brightness change on all of the three lines is being caused by a moving object (i.e., single moving object). When the brightness change of the pixel is detected on some of the three detection lines, it is determined that the brightness change detected on some of the three lines is not being caused by a moving object. In other words, when all three of the detection lines L1, L2, and L3 have brightness change of a pixel, the change in brightness is determined to be caused by a single moving object. On the other hand, when some of the detection lines L1, L2, L3 detect a change of brightness, the change in brightness is not determined to be caused by a moving object.

The CPU of the vehicle periphery monitoring apparatus 10 performs the process of FIG. 6 repeatedly. The apparatus 10 receives an input of a shift position signal representing a position of the shift lever.

The CPU determines whether an ignition (IG) switch of the subject vehicle is turned to an on state (S100). When the ignition switch of the vehicle is not turned to the on state (S100:NO), and S100 is continuously performed until the ignition switch is turned to the on state.

When the ignition switch of the vehicle is turned to the on state (S100:YES), the CPU determines whether the position of the shift fever is at either a reverse (R) position or a parking (P) position based on the shift position signal (S102). When the CPU determines that the shift level position is at either the reverse (R) position or the parking (P) position (S102:YES), the CPU, at S106, acquires a captured image from the in-vehicle camera 20, and detects a brightness change of a pixel along the detection lines L1, L2, L3.

The CPU, at S108, determines whether the number of detection lines that detect the brightness change caused by a moving object is only one. Specifically, the CPU determines whether the brightness change, which is assumed to be caused by a single moving object, is detected by only one detection line among the three detection lines.

If a brightness change is detected at two or more positions along one detection line, it may be a case where two or more moving objects are simultaneously detected. Therefore, in such a case, it is determined that two or more moving objects are causing the brightness change at different positions, for the determination of the moving object.

If the brightness change is not detected by only one detection line (S108:NO), the CPU, at S110, determines whether the number of detection lines detecting the brightness change is two. More practically, the CPU determines whether the brightness change is detected on two detection lines among the three detection lines.

If the number of detection lines that detect brightness change is not two (S110:NO), the CPU, at S112, determines whether the number of detection lines detecting the brightness change is three. More practically, the CPU determines whether the brightness change, which is assumed to be caused by a single moving object, is detected by all three detection lines.

The CPU returns to S102 without providing a notification for the occupant of the vehicle when a brightness change is not detected by at least one of the detection lines L1, L2, L3 (i.e., when S108 is YES, or S110 is YES, or S112 is NO). Therefore, even if the brightness change is detected by one out of three detection lines (i.e., S108:YES) or two out of three detection lines (i.e., S110:YES), a moving object is not detected and a notification is not provided.

When the brightness change is detected on all three detection lines, which is assumed to be cause by a single (i.e., same) moving object (S112:YES), the CPU, at S114, provides a notification to the occupant of the vehicle and then returns to S102. Specifically, the moving object is identified as either, for instance, an automobile, a two wheel vehicle, or a pedestrian according to the size of the brightness change along the detection line. The CPU then displays a message, such as "an automobile approaching", on the display unit 30 with a guidance voice output from the sound output device 40. Or, displays a message "a pedestrian walking" on the display unit 30 with a guidance voice output from the sound output device 40, if it is determined that a pedestrian is moving from the center toward the right of the captured image.

When it is determined that the shift lever position is in a position other than the reverse (R) position or the parking (P) position based on the shift position signal (S102:NO), the CPU is interrupted at S104, and repeats the determination of S102.

According to the above-described configuration, when the CPU determines that the brightness change, which is assumed to be caused by the same moving object, is detected on all three detection lines, the brightness change of all of the detection lines is determined as being caused by a single (i.e., same) moving object. When the CPU determines that the brightness change is detected on some of the detection lines, the brightness change detected is determined as not being caused by a moving object. Therefore, the apparatus of the present embodiment achieves advantageous effects preventing false determination of determining, for instance, a fallen leaf or a noise in the captured image, as a moving object.

(Second Embodiment)

In the first embodiment, the brightness change is determined as being caused by a moving object when such change is detected on all three detection lines, and the brightness change is determined as not being caused by a moving object when such change is detected on less than three detection lines.

In the second embodiment, the moving object detection is performed by changing the parameter for determining whether the brightness change is caused by the moving object in a manner that the fewer the number of the detection lines on which the brightness change is detected, the harder the determination that the brightness changed is caused by the moving object is made.

The configuration of the vehicle periphery monitoring apparatus 10 in the present embodiment is same as the configuration of the apparatus 10 in the first embodiment. Further, like numbers are used to represent like parts in the first and second embodiments, with the description being focused to the difference between the two embodiments.

Figure 7:
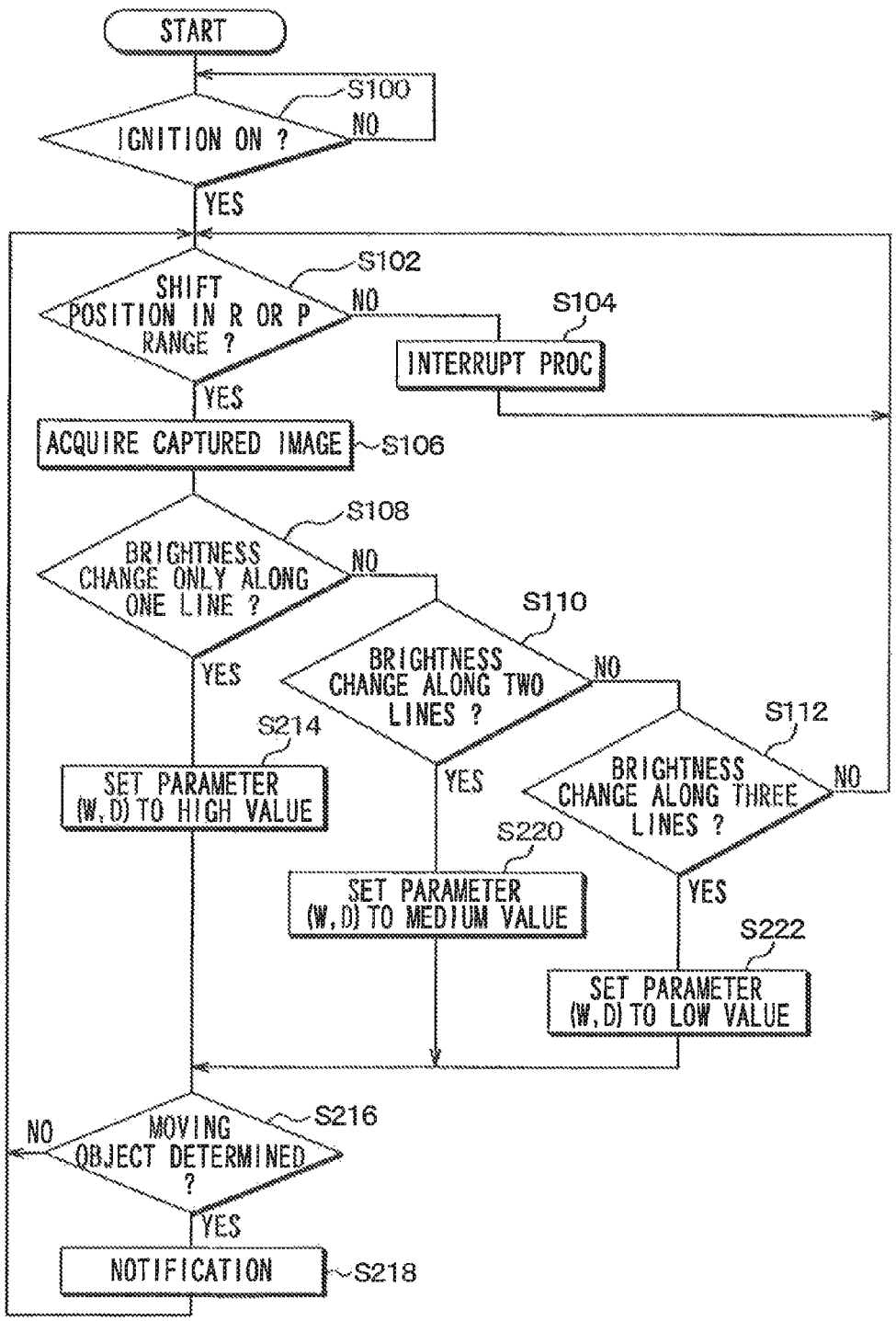
FIG. 7 is a flowchart of a process performed by the CPU of the vehicle periphery monitoring apparatus in a second embodiment of the present disclosure.

FIG. 7 shows a flowchart of a process performed by the vehicle periphery monitoring apparatus 10. In the flowchart of FIGS. 7, S100 to S112 are same as those in FIG. 6. Therefore, the description of those steps is omitted.

When the brightness change is not detected on any of the detection lines, (S112:110), the CPU returns to S102.

When a brightness change is detected on all three detection lines (S112:YES), the CPU, at S222, set the parameter setting (i.e., W and D) to a low value. Specifically, a brightness changed detection on all three detection lines leads to a low value setting for both of the thresholds: (i) the rise and fall thresholds for evaluating the rise and fall of the brightness change along the detection line and (ii) the movement threshold for evaluating the amount of movement of the brightness change along the detection line.

The CPU then determines whether the brightness change detected on the detection line is caused by a moving object, at S216. In the event the brightness change, which is assumed to be caused by the same moving object, is detected on all three detection lines, it is highly likely that such brightness change is actually caused by a single moving object. Therefore, the thresholds are set to have a relatively low value, for performing the moving object determination of S216.

When the CPU determines that the brightness change along the detection line is caused by a moving object (S216: YES), it notifies the occupant of the vehicle of the present of the moving object at S218 and then returns to S102. On the other hand, when the CPU determines that the brightness change along the detection line is not caused by the moving object (S216:NO), it returns to S102 and without performing S218.

At S110, when a brightness change is detected only on two detection lines out of three detection lines (S110:YES), the CPU, at S220, sets parameters (W and D) to a medium value. In other words, (i) the rise and fall thresholds for evaluating the rise and fall of the brightness change along the detection line and (ii) the movement threshold for evaluating the amount of movement of the brightness change along the detection lines are set to a medium value.

The CPU then determines whether the brightness change detected along the detection lines is caused by a moving object, at S216. In such a case, the brightness change, which is assumed be caused by the same moving object, is detected only on two detection lines out of three detection lines, therefore, it is less likely that such brightness change is caused by a single moving object. Thus, the thresholds are set to have a medium value for performing the moving object determination, so that the determination that such brightness change is being caused by the moving object is made harder (i.e., more difficult to satisfy threshold with medium value than with the low value).

When the brightness change along the detection line is caused by a moving object (S216:YES), the CPU notifies the occupant of the vehicle of the present of the moving object at S218 and then returns to S102. On the other hand, when the brightness change is not caused by the moving object (S216: NO), the CPU returns to S102 without performing S218.

At S108, when a brightness change is detected only along one detection line out of three detection lines (S108:YES), the CPU sets the parameters (W and D) to a high value setting for both of the thresholds at S214. In other words, the rise and fall thresholds for evaluating the rise and fall of the brightness change along the detection line, and the movement threshold for evaluating the amount of movement of the brightness change along the detection line are set to high values.

The CPU then determines whether the brightness change detected along the detection line is caused by a moving object, at S216. in such a case, the brightness change is detected only along one detection line out of three detection lines, therefore, it is much less likely that such brightness change is caused by a moving object. Accordingly, the thresholds are set to have a high value for performing the moving object determination, such that the determination that such brightness change is being caused by the moving object is made much harder (more difficult to satisfy threshold with the high value than with either the medium value or the low value). In other words, the determination is made with a higher threshold than either the medium value or the low value, thereby providing a more accurate determination.

When the brightness change along the detection line is caused by a moving object (S216:YES), the CPU notifies the occupant of the vehicle of the present of the moving object at S218 and then returns to S102. On the other hand, when the brightness change is not caused by the moving object (S216: NO), the CPU returns to S102 without performing S218.

According to the above-described configuration, when the CPU determines that the brightness change is detected along all three detection lines, the moving object determination is performed based on the brightness change of the pixel detected along all three detection lines and the parameter that is most suitable for determining whether the brightness change is caused by the moving object. In particular, changing the determination of whether the brightness change is caused by the moving object is made harder or more accurately when the number of brightness change detected detection lines decreases.

Therefore, it is advantageous that such moving object detection scheme does not falsely determine a fallen leaf, a noise in the captured image or the like as a moving object.

Further, because the parameter includes at least one of the rise and fall thresholds for evaluating the rise/fall of the brightness change along the detection line and the vehicle periphery monitoring apparatus 10 increases the value of at least one of the rise and fall thresholds when the number of brightness change detected detection lines decreases, the false determination of a moving object is prevented, thereby improving the accuracy of the moving object determination.

Further, because the parameter includes the movement threshold for evaluating the amount of movement of the brightness change along the detection line and the vehicle periphery monitoring apparatus 10 increases the value of the movement threshold when the number of brightness change detected detection lines decreases, the false determination of a moving object is prevented, thereby improving the accuracy of the moving object determination.

(Other Embodiments)

In the first and second embodiments, three detection lines extend along the right-left axis of the captured image and the brightness change of the pixel caused by a moving object is detected along the three detection lines. However, the number of detection lines is not necessarily limited to three, and may be, for example, two detection lines or more than three detection lines. Further, the setting of the detection line may not necessarily be limited to the setting described in the embodiments.

Further, in the second embodiment, the presence of the moving object is notified to the vehicle occupant in the same manner without regard to the number of detection lines on which the brightness change is detected when the determination in S216 determines the moving object.

However, a display form for notifying the presence of the moving object for the vehicle occupant may be changed depending on the number of detection lines. For instance, when the determination of the moving object is based on the brightness change detected along one/two/three detection lines, the moving object presence notification may be provided in a color of blue/yellow/red, respectively, on the display unit 30. Further, the number of detection lines detecting the brightness change may be reflected in a notification sound for notifying the presence of the moving object for the vehicle occupant.

Figure 8A:
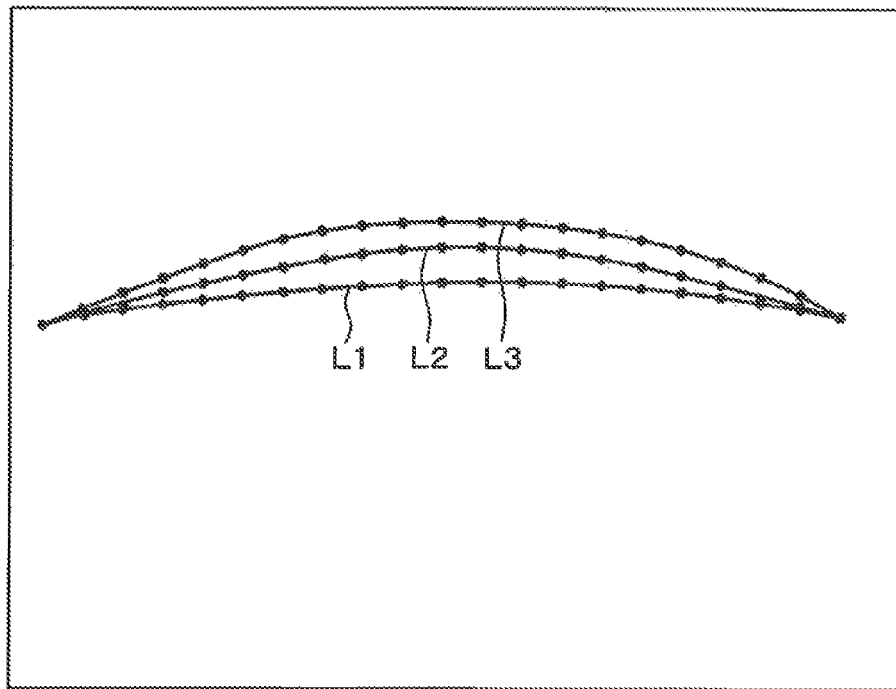
FIGS. 8A and 8B are illustrations of changing the amount of pixels along the detection lines for detecting the brightness change.
Figure 8B:
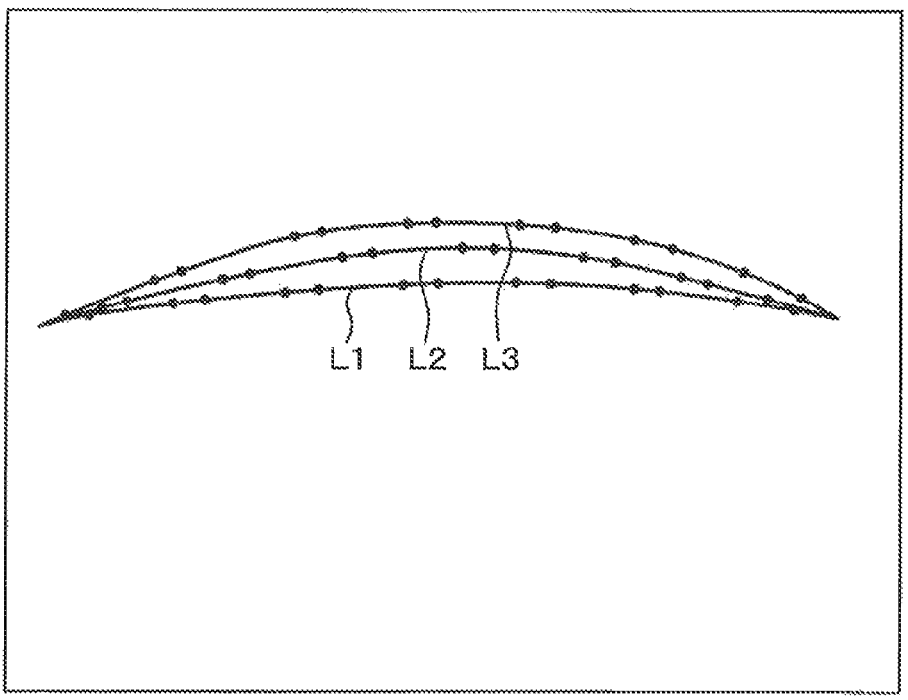

Further, as shown in FIG. 8A, the brightness change is detected for all pixels on the detection lines L1 to L3. However, as shown in FIG. 8B, the brightness change may be detected only for culled pixels (Le., selected pixels) from among all pixels on the detection lines L1 to L3, thereby reducing the process load.

Further, the above first and second embodiments show examples of moving object determination for the captured image that captures a rear view of the subject vehicle by using the in-vehicle camera 20. However, not necessarily limiting the detection to such examples, the moving object determination may be performed for a front view image captured by the in-vehicle camera 20.

The correspondence between the above embodiment and claims is that, S106 corresponds to a detection unit, and S108, S110, S112, S214, S220, S222 correspond to a moving object determination unit, and S114, S218 correspond to a notification unit.

What is claimed is:

1. A vehicle periphery monitoring apparatus comprising:
a processor, the processor being configured to
detect, in a detection unit, a brightness change of a pixel along a plurality of detection lines, the plurality of detection lines extending along a right-left axis in an image captured by an in-vehicle camera as an image of a vehicle periphery; and
determine, in a moving object determination unit, a presence of the moving object based on the brightness change of the pixel detected by the detection unit and a determination condition which includes a parameter for evaluating the brightness change to determine whether the brightness change of the pixel along the detection lines is caused by the moving object, wherein
the moving object determination unit changes the determination condition for determining whether the moving object is present based upon a number of the detection lines along which the brightness change is detected by the detection unit, and as the number of detection lines that have the brightness change decreases, the harder it is to satisfy the determination condition for determining that the moving object is present, and the parameter includes at least one of a rise threshold to evaluate a rise of the brightness change along each detection line, and a fall threshold to evaluate a fall of the brightness change along each detection line, and the moving object determination unit changes at least one of the rise threshold and the fall threshold in accordance with the number of detection lines along which brightness change is detected, and as the number of detection lines along which the brightness change is detected decreases, at least one of the rise threshold and the fall threshold increases.

2. The vehicle periphery monitoring apparatus of claim 1, wherein the moving object determination unit determines that the moving object is present when the brightness change is detected along all of the plurality of detection lines, and the moving object determination unit determines that the moving object is not present when the brightness change is not detected along at least one of the plurality of detection lines.

3. The vehicle periphery monitoring apparatus of claim 1, wherein the moving object determination unit sets the determination condition for determining the presence of the moving object based on the number of detection lines along which the brightness change is detected and the parameter, and by changing the parameter and as the number of detection lines along which the brightness change is detected decreases, the parameter used to evaluate the brightness change and determine whether the brightness change along the detection lines is caused by the moving object is set to a value that is harder to satisfy.

4. The vehicle periphery monitoring apparatus of claim 3, wherein the moving object determination unit determines the presence of the moving object by changing a movement threshold, and as the number of detection lines along which the brightness change is detected decreases, the movement threshold increases.

5. The vehicle periphery monitoring apparatus of claim 3 wherein the processor is further configured to notify, by a notification unit, the presence of the moving object via a notification when the moving object determination unit determines the moving object is present, wherein the notification unit changes the notification according to the number of detection lines along which the brightness change is detected by the detection unit.

6. The vehicle periphery monitoring apparatus of claim 1, wherein the plurality of detection lines extend from a center of the image toward right and left sides of the image, and gap between each of the plurality of detection lines decreases towards the right and left sides of the image.

7. A vehicle periphery monitoring apparatus comprising:
a processor, the processor being configured to
detect, in a detection unit, a brightness change of a pixel along a plurality of detection lines, the plurality of detection lines extending along a right-left axis in an image captured by an in-vehicle camera as an image of a vehicle periphery; and determine, in a moving object determination unit, a presence of the moving object based on the brightness change of the pixel detected by the detection unit and a determination condition which includes a parameter for evaluating the brightness change to determine whether the brightness change of the pixel along the detection lines is caused by the moving object, wherein the moving object determination unit changes the determination condition for determining whether the moving object is present based upon a number of the detection lines along which the brightness change is detected by the detection unit, and as the number of detection lines that have the brightness change decreases, the harder it is to satisfy the determination condition for determining that the moving object is present, and the parameter includes a movement threshold to evaluate a movement amount of the brightness change along each detection lines, and the moving object determination unit determines the presence of the moving object by changing the movement threshold, and as the number of detection lines along which the brightness change is detected decreases, the movement threshold increases.

8. The vehicle periphery monitoring apparatus of claim 7, wherein the moving object determination unit determines that the moving object is present when the brightness change is detected along all of the plurality of detection lines, and the moving object determination unit determines that the moving object is not present when the brightness change is not detected along at least one of the plurality of detection lines.

9. The vehicle periphery monitoring apparatus of claim 7, wherein the moving object determination unit sets the determination condition for determining the presence of the moving object based on the number of detection lines along which the brightness change is detected and the parameter, and by changing the parameter and as the number of detection lines along which the brightness change is detected decreases, the parameter used to evaluate the brightness change and determine whether the brightness change along the detection lines is caused by the moving object is set to a value that is harder to satisfy.

10. The vehicle periphery monitoring apparatus of claim 9, wherein the moving object determination unit changes at least one of a rise threshold and a fall threshold in accordance with the number of detection lines along which brightness change is detected, and as the number of detection lines along which the brightness change is detected decreases, at least one of the rise threshold and the fall threshold increases.

11. The vehicle periphery monitoring apparatus of claim 9 wherein the processor is further configured to notify, by a notification unit, the presence of the moving object via a notification when the moving object determination unit determines the moving object is present, wherein the notification unit changes the notification according to the number of detection lines along which the brightness change is detected by the detection unit.

12. The vehicle periphery monitoring apparatus of claim 7, wherein the plurality of detection lines extend from a center of the image toward right and left sides of the image, and a gap between each of the plurality of detection lines decreases towards the right and left sides of the image.

\* \* \* \* \*